Aug. 13, 1963  H. BURKHARDT  3,100,846
PHOTOELECTRIC PROCESS FOR MEASURING AND ADJUSTING THE
POSITION OF OBJECTS, PARTICULARLY OF SCALE LINES
Filed Nov. 12, 1958  12 Sheets-Sheet 1
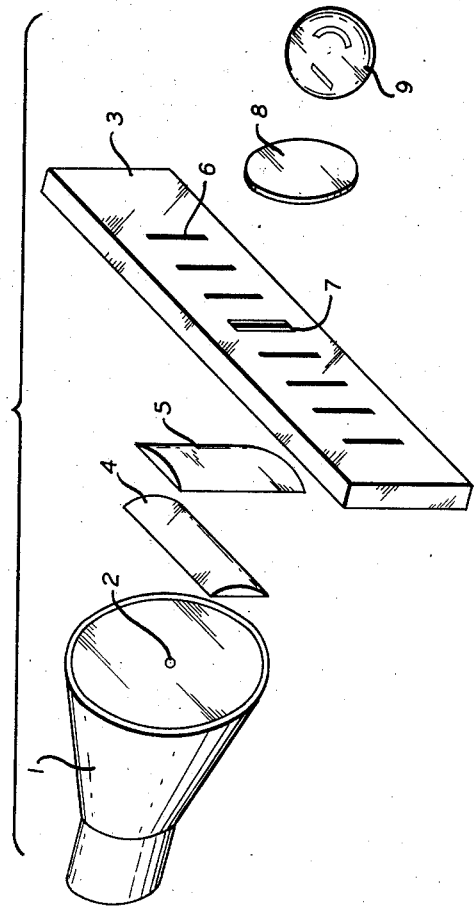
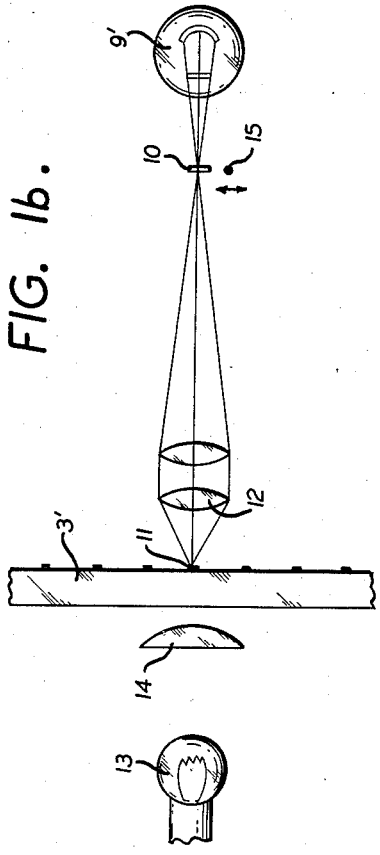
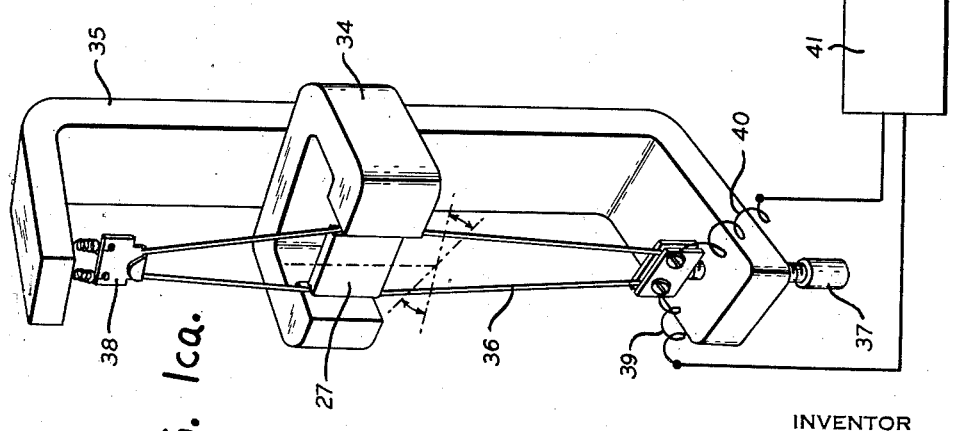
INVENTOR
HORST BURKHARDT
ATTORNEY

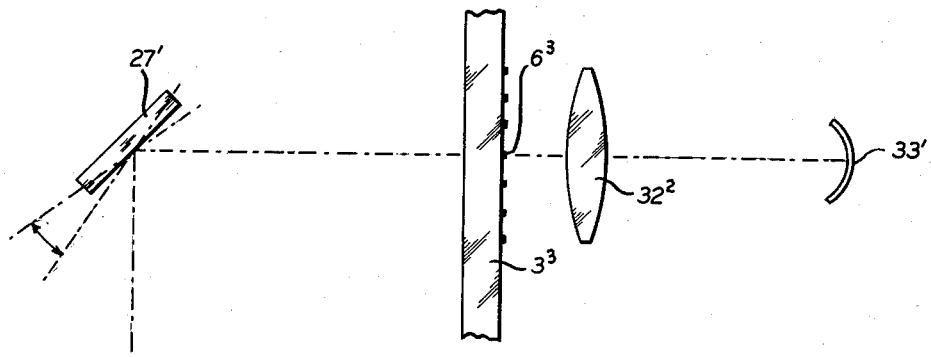
FIG. 1d.
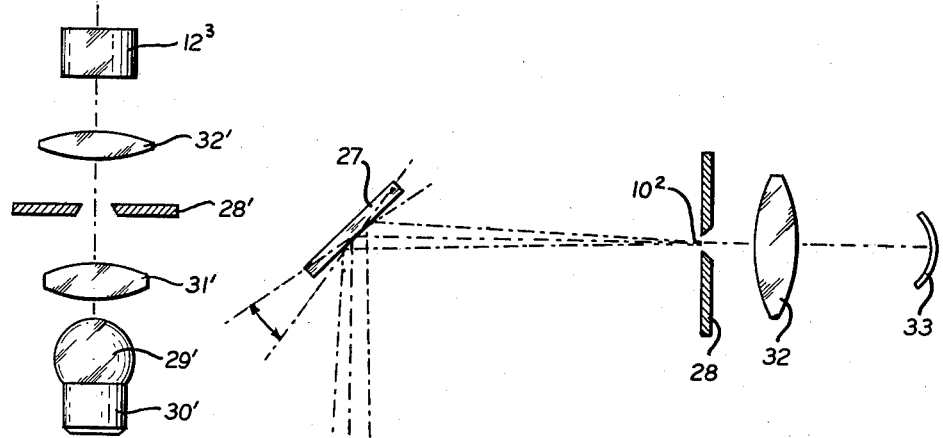
FIG. 1c.
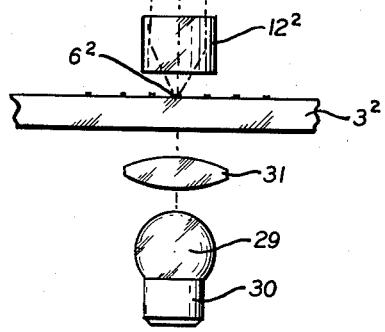
INVENTOR
HORST BURKHARDT
BY
ATTORNEY

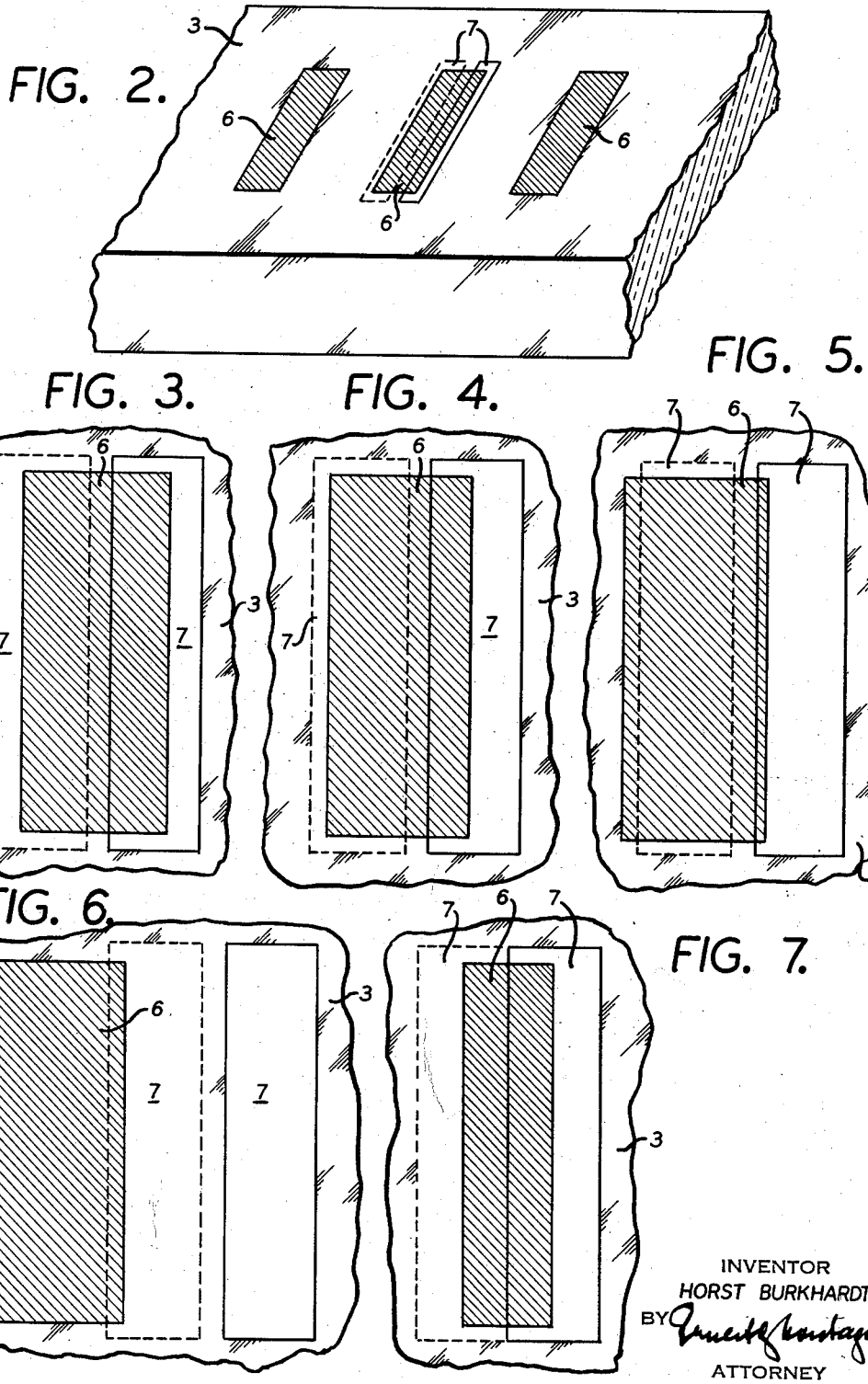

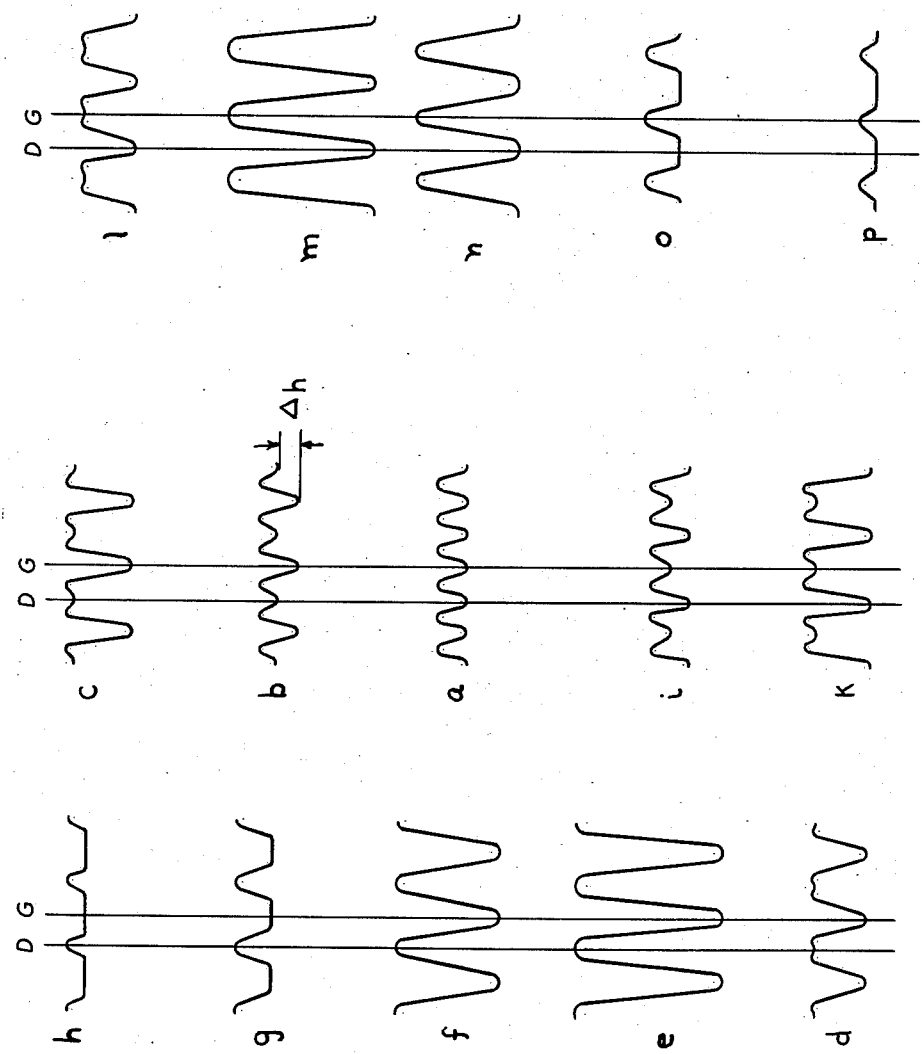

INVENTOR
HORST BURKHARDT
BY
ATTORNEY

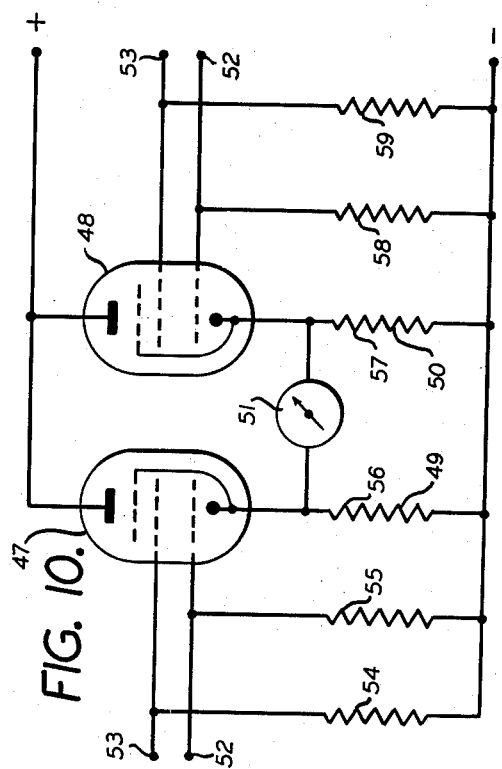
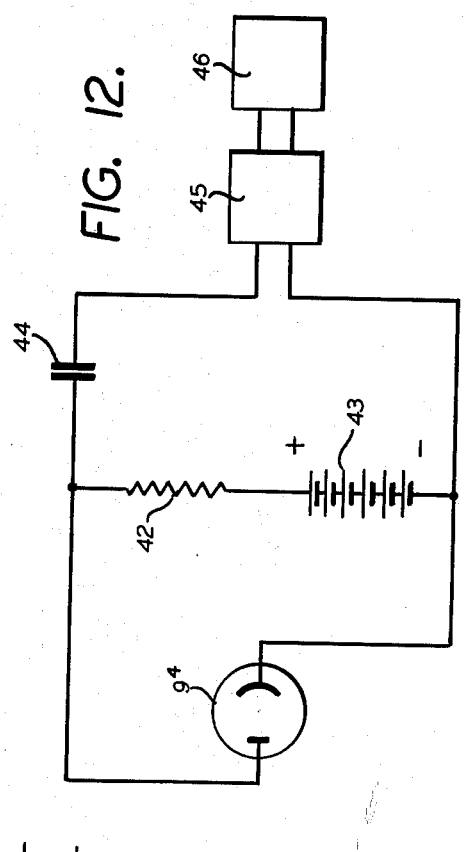
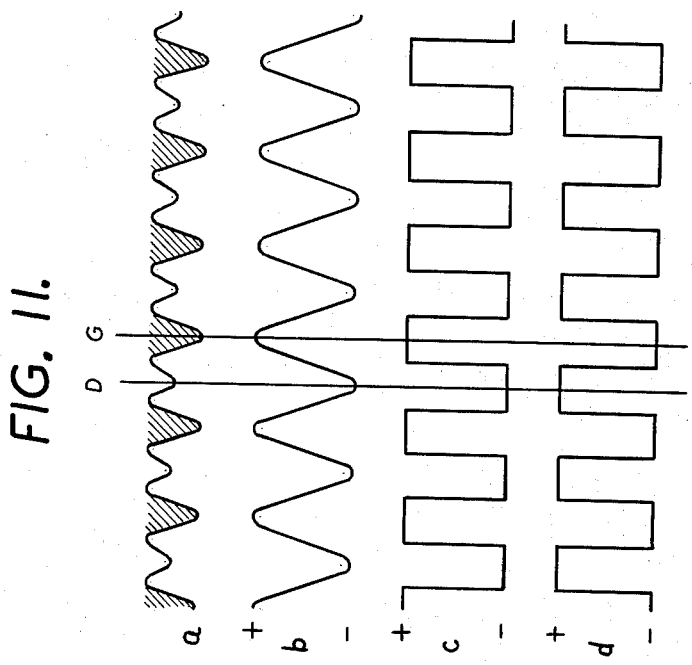

INVENTOR
HORST BURKHARDT
BY [signature]
ATTORNEY

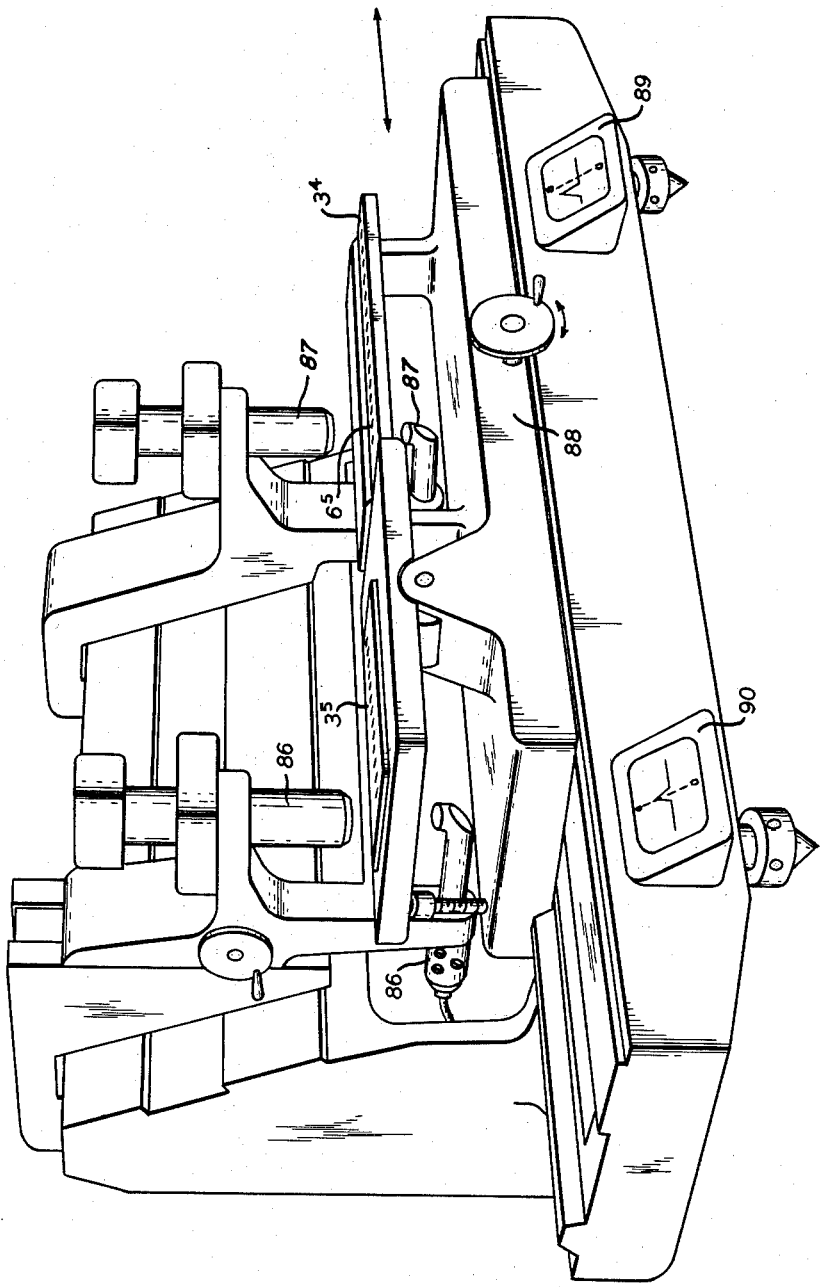

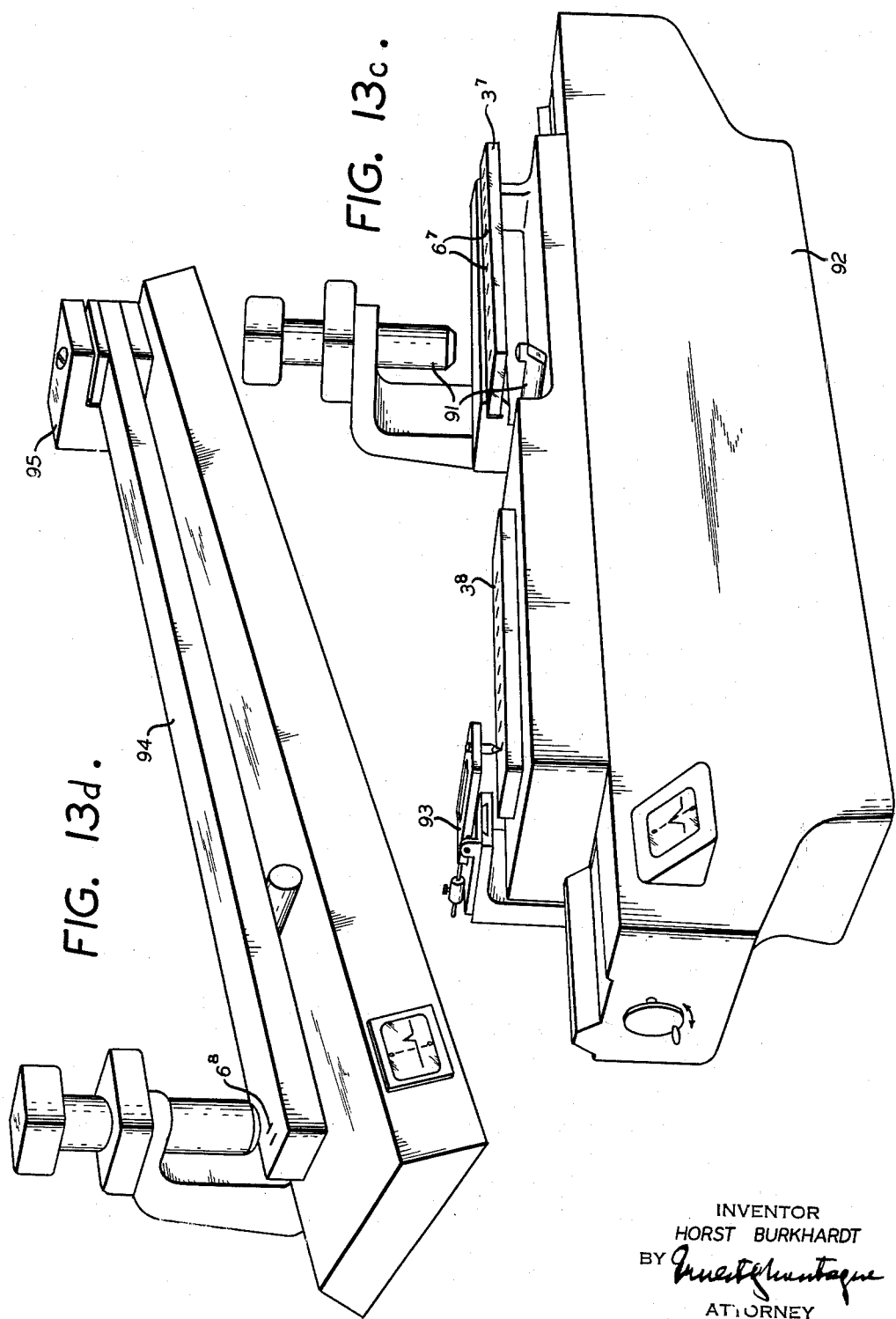

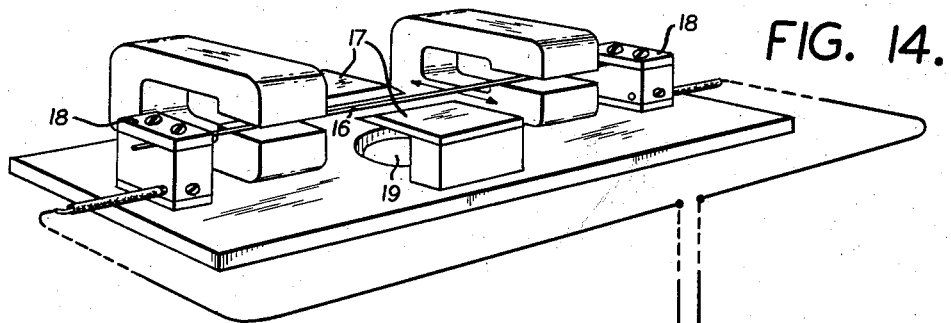
FIG. 14.
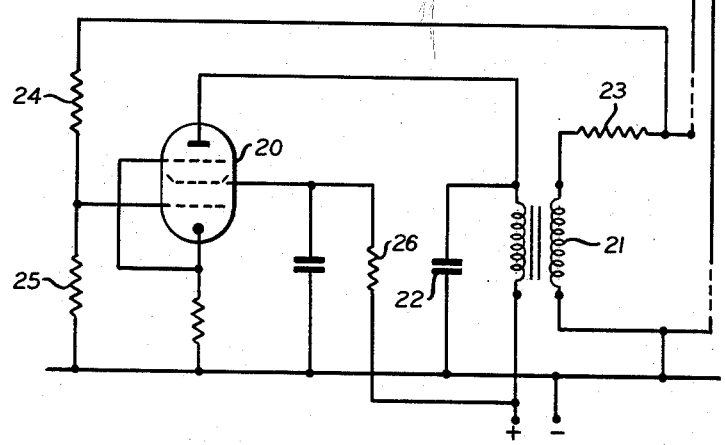
FIG. 15.
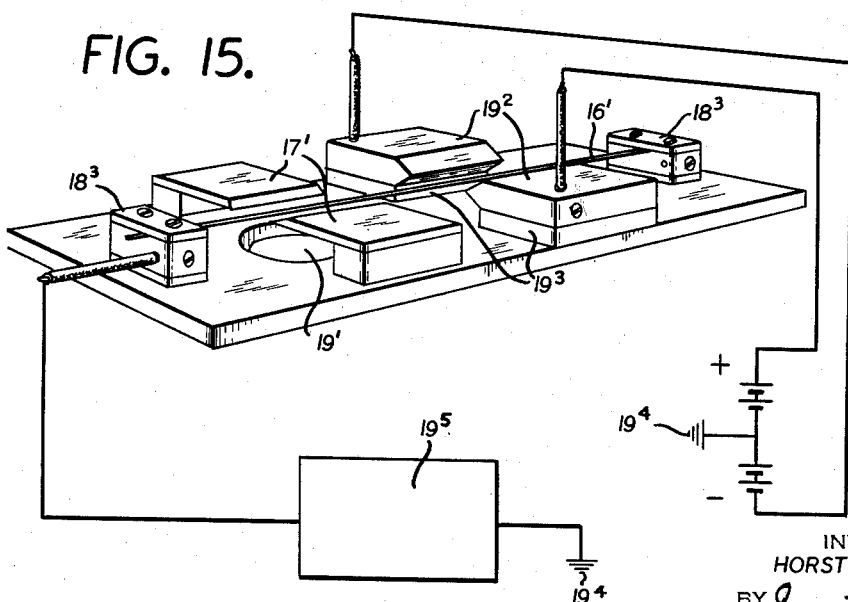
INVENTOR
HORST BURKHARDT
BY
ATTORNEY Aug. 13, 1963            H. BURKHARDT            3,100,846
PHOTOELECTRIC PROCESS FOR MEASURING AND ADJUSTING THE
POSITION OF OBJECTS, PARTICULARLY OF SCALE LINES
Filed Nov. 12, 1958                               12 Sheets-Sheet 11
FIG. 16.
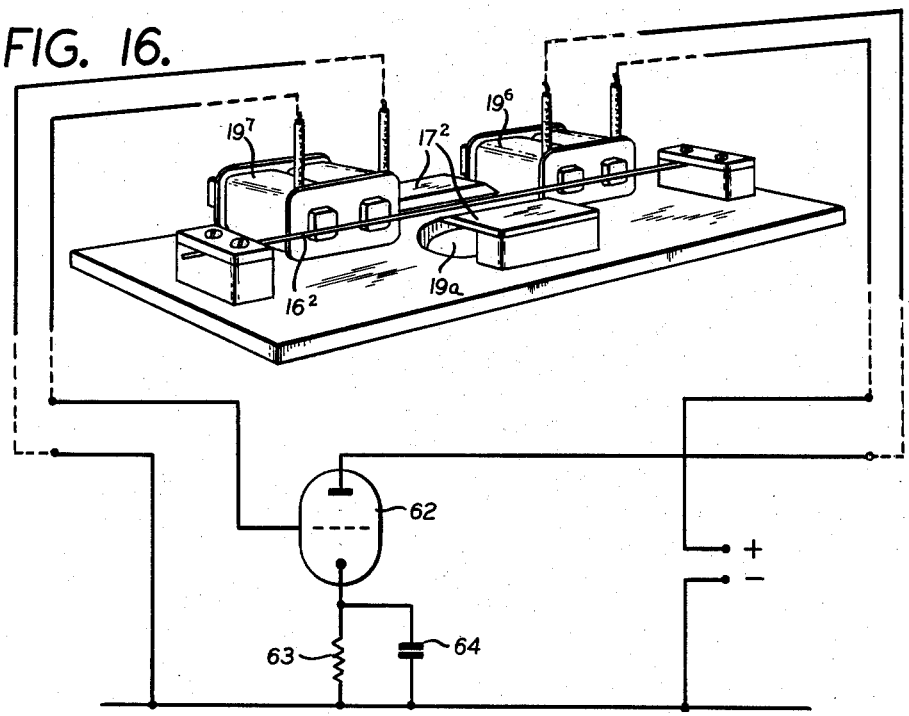
FIG. 17.
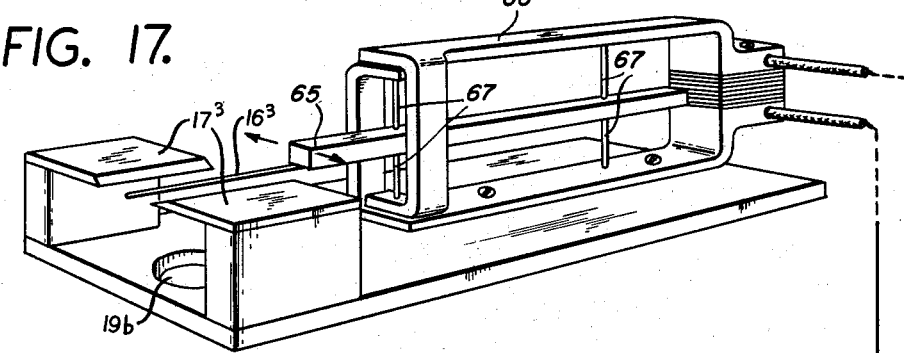
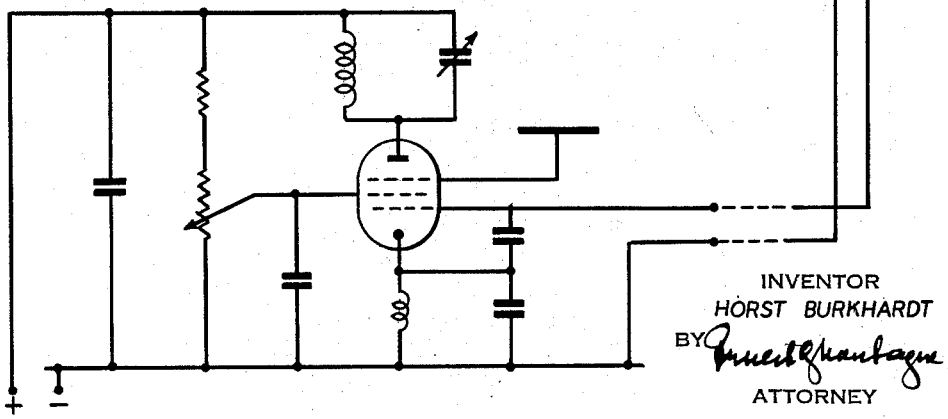
INVENTOR
HORST BURKHARDT
BY
ATTORNEY Aug. 13, 1963  H. BURKHARDT  3,100,846
PHOTOELECTRIC PROCESS FOR MEASURING AND ADJUSTING THE
POSITION OF OBJECTS, PARTICULARLY OF SCALE LINES
Filed Nov. 12, 1958  12 Sheets-Sheet 12

INVENTOR
HORST BURKHARDT
BY
ATTORNEY

United States Patent Office 3,100,846
Patented Aug. 13, 1963

3,100,846
PHOTOELECTRIC PROCESS FOR MEASURING AND ADJUSTING THE POSITION OF OBJECTS, PARTICULARLY OF SCALE LINES
Horst Burkhardt, Altenmarket, near Traunstein, Upper Bavaria, Germany, assignor to Fa. Wenczler & Heidenhain, Traunreut, near Traunstein, Upper Bavaria, Germany, a corporation of Germany
Filed Nov. 12, 1958, Ser. No. 773,431
6 Claims. (Cl. 250—219)

The present invention relates to a photoelectric process for measuring and adjusting the position of objects, particularly of scale lines.

In order to achieve exactness in the adjustment and measuring in the position of objects, particularly of scale lines, as of longitudinal and circular divisions and the like, which exactness surpasses appreciably that of optically visual methods, light electrical devices have been used. Thus, a light electrical apparatus has been developed wherein an optical graduation line picture is subjected to a swinging movement by means of a deflector, for instance a swinging mirror in the direction of the scale relative to a diaphragm which is in series with a photo cell. The adjustment and the measuring, respectively, of the scale line position is performed in such a manner that the time intervals are measured which are taken between the light pulses produced on the photo cell by the swinging movement. The drawback of these methods resides in the fact that in case of changing of the scale line widths, first of all, the outside of the symmetry position, and not necessarily the center point of the scale line, is measured, since the center point of the scale line is obtained by an electrical differentiation of the light pulse which originally appears as a bell curve. This electrical differentiation cannot be performed with complete exactness, it is rather achieved with certain approximation only. Since the sensitivity curve of the device is, however, not a linear function, measuring errors may occur outside of the symmetry position, even if the differentiation is performed in the same manner by back and forth movement. A further drawback of the method is found in the fact that high requirements are set for the deflector as to its amplitude constancy, since the sensitivity is about proportional to the swinging amplitude. These drawbacks can be avoided by providing a symmetry adjustment of the light intensity occurrences instead of a time interval measurement.

Devices are known in which the symmetry adjustment is performed visually for instance by means of ocular screw micrometers, wherein the scale line to be set is caught by the eye symmetrically between two linear measuring marks. By this optical process it is possible to achieve, in principle, an adjustment exactness of five arc seconds corresponding with 0.005 mm. in the clear view. By using an optical enlargement this adjustment exactness can be increased to about $0.1\mu$. A decisive advantage of the symmetry adjustment resides in the fact that it may be performed also with this high exactness, even if the scale lines to be set do not have corresponding exact geometrical forms for instance if the width thereof varies within one scale line or from scale line to scale line.

A disadvantage of this subjective visual symmetry adjustment resides in the fact that the eye tires very fast and is subjected to adaptation variations, so that the mentioned exactness cannot be brought about with safety, particularly since the symmetry equalization is not performed equally by different observers. Furthermore the human unreliability and the fact that the adjustment exactness of 0.1 micron is not sufficient for the latest requirements speak against the subjective visual symmetry adjustment, which in addition is also very time consuming.

It is, therefore, one object of the present invention to provide a photoelectric process wherein the symmetry adjustment is not performed by visual means, but by photoelectric means. By such arrangement the above-stated drawbacks are completely avoided and the process of the present invention operates exactly and the exactness is increased by two decimal potencies.

The present invention may be used, among others, for the following purposes:

(1) For the manufacture of exact scales by means of an existing precision scale.

(2) For exact adjustment or measurement of the position of slides on machine tools.

(3) For the determination of errors in scales by means of an existing precision scale.

(4) For the determination of the thermal expansion of bodies and of materials, respectively.

In the mentioned and all other applications of the process in accordance with the present invention, the latter is used for adjustment or for measuring. The word "adjustment" is to be understood in such manner that a scale or a body is brought into a predetermined desired position relative to another body, particularly relative to the adjustment device, while it is to be understood that the language "measuring" means the numerical determination of the position of a scale or of a body relative to another body, particularly relative to measuring device.

In the light electrical process, in accordance with the present invention, an optical arrangement which may be known, is used, in which the object, the position of which is to be measured or adjusted, for instance a scale line or a picture thereof swings about a zero position relative to a diaphragm, for instance to a visual field diaphragm or aperture diaphragm or of a picture thereof or relative to a light source and the light stream, flowing through this arrangement, is fed to a photo cell.

With these and other objects in view which will become apparent in the following detailed description, the present invention will be clearly understood in connection with accompanying drawings, in which:

FIGURE 1a is a schematic showing of the principle known in television of scanning of light points;

FIGS. 1b, 1c and 1d demonstrate schematically a swinging process obtained by using the principle shown in FIG. 1a;

FIG. 1ca is a schematic showing of a swinging mirror;

FIG. 1d shows schematically the projection of a band of the band lamp through a condenser to a diaphragm;

FIGS. 2 to 7 are a perspective view and top plan views of embodiments of applications of the principle disclosed in FIG. 1a;

FIGS. 8a to 8p depict diagrammatically the energy reduction in the working resistance of the photo cell in the different situations;

FIG. 10 is a circuit diagram of an instrument used as indicating device;

FIGS. 11a to 11d depict diagrammatically the picture of the energy of the photo cell;

FIG. 12 is a circuit diagram of the measuring device in connection with a cathode ray tube;

FIG. 13b is a perspective front view of a longitudinal measuring comparator in which the principle of FIG. 1b is incorporated;

FIG. 13c is a perspective front view of a machine which constitutes a division machine and uses the principle of the present invention;

FIG. 13d is a perspective front view of a device for the determination of the expansion coefficients of materials using the process of the present invention;

FIG. 14 is a perspective front view of a device indicating the swinging system in connection with a circuit diagram; and FIGS. 15 to 19 are perspective front views of additional embodiments of the swinging system in connection with circuit diagrams.

Figure 9A:
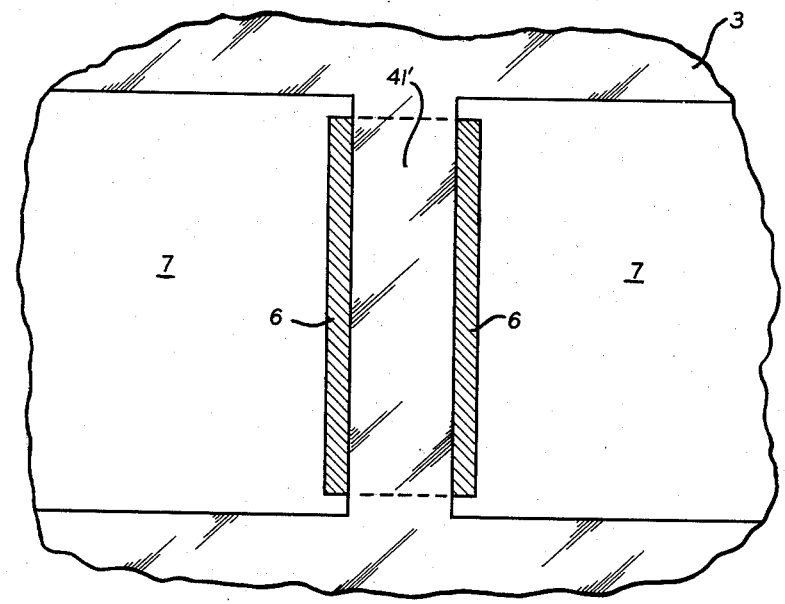
FIGS. 9a and 9b show schematically the arrangement of the light recess.

Referring now to the drawings and in particular to FIG. 1a, it will be readily seen, that a Brown tube 1 is provided which has on its screen a light point 2. The light point 2 may be produced by known means and is subjected to a symmetrical swinging movement about a zero position perpendicularly to the scale lines of a transparent measuring rod 3 which is disposed in front of the Brown tube 1. Between the measuring rod 3 and the Brown tube 1 are disposed cylinder lenses 4 and 5 which form an anamorphous projection system. The transparent measuring rod 3 carries non-transparent scale lines 6. An anamorphous picture 7 is formed of the light point 2 by means of the two cylinder lenses 4 and 5, which anamorphous picture 7 has the shape of an elongated rectangle and is oriented in such a manner that the long sides of the rectangle are disposed parallel to the scale lines 6 and its swinging takes place across the scale of the measuring rod 3. Furthermore, a field lens 8 is also provided which serves the purpose to feed the light flowing through the system in form of bundles towards a photo cell 9 and a photo multiplier, respectively. Either a cathode ray tube or an indicating instrument connected at the output side of the photo cell 9 is used as an indicator. These electrical devices, connected with the photo cell 9, are not shown in FIG. 1a and are later described more clearly in connection with FIGS. 10 and 12.

The light source comprises in this arrangement, in accordance with FIG. 1a, a light point 2 appearing on the screen of the cathode ray tube or Brown tube 1. This light point 2 is diverted in horizontal direction such, that it forms on the screen a horizontal line, as seen by the naked eye. The necessary exactness and precision of the deviation as to the amplitude and frequency is arrived at (1) By providing for the horizontal deviation a low-frequency generator of high amplitude and frequency constancy as energy source; and (2) By stabilizing the high voltages in the Brown tube 1, particularly the high voltages electronically to such a degree that the deviation sensitivity remains constant after a predetermined starting time.

If only zero measurements are to be made, that means adjustment to the zero value, neither the amplitude nor the frequency are considered. In making measurements outside of the zero position, the measuring error in percentages for not too great deviations is equal to the amplitude error in percentages in the first approximation. An amplitude constancy of 1% is thus sufficient for most of the requirements. A conventional sender circuit for the deviation of the light point on the screen of the cathode ray tube 1, wherein the feeding voltages are well stabilized and wherein the best possible temperature-constant building elements are used, works already with such exactness.

The practical realization of the swinging process may be achieved also in known manner by means disclosed in FIGS. 1b, 1c and 1d in known manner, instead of the arrangement shown in FIG. 1a.

In accordance with the arrangement of FIG. 1b, a real picture 10 of the scale line 11 of the measuring rod 3' is produced through the objective 12, which scale line 11 is lit by the lamp 13 by means of a condenser 14, of which image 10 swings periodically a movable diaphragm 15, for instance a wire subjected to vibrations. The light beam which flows through the system and which is controlled by the relative position between the scale line picture 10 and the diaphragm or shutter 15, respectively, is fed to a photo cell 9'.

In the arrangement disclosed in FIG. 1b again either a cathode ray tube or an indicator instrument is connected with the output of the photo cell 9'. These electrical devices, which are switched behind the photo cell 9', are likewise not shown in FIG. 1b and are more clearly described in connection with FIGS. 10 and 12.

FIG. 14 discloses all details of the moving diaphragm disclosed in FIG. 1b, which comprises a wire 16 disposed between the air spaces of two permanent magnets.

If the wire 16 (FIG. 14) is subjected to an alternating E.M.F., the wire 16 swings in the direction indicated by an arrow within the plane of the slit diaphragm formed by two jaws 17. The wire 16 is clamped between two insulating blocks 18 disposed at opposite ends of a base. The opening 19 provided below the slit diaphragm serves the purpose of permitting penetration of the light rays. The viewing field is limited by the two jaws 17.

The alternating E.M.F. is fed by a sender which includes a pentode 20. A starting transformer 21 is provided, the primary coil of which is adjusted to the frequency of the wire 16 by means of a condenser 22. A portion of the starting E.M.F. is coupled back to the control grid of the pentode 20 by means of the resistances 23, 24 and 25, so that the pentode 20 swings continuously with the frequency of the wire 16. Normally, the primary coil of the transformer 21 is adjusted to the ground wave of the wire 16.

The wire has its maximum amplitude in the center between the permanent magnets, that means at the point of the slit diaphragm between the jaws 17. The resistance 26 serves the purpose to feed the grid.

Instead of two magnets, it is possible to provide a single magnet for the wire 16, which operates as a moving diaphragm.

This electrodynamic device has the advantage, that it permits wide swinging amplitudes, even if stronger wires are used and even if the wire is subjected to relatively strong stress. It is to be understood that different embodiments of this electrodynamic arrangement are possible. Thus, for instance, permanent magnets can be used instead of electromagnets. Also alternating current magnets in connection with a wire feeding direct current may be used.

Referring now to the arrangement disclosed in FIG. 1c, the scale line $6^2$ of the scale on the rod $3^2$ is projected as the picture $10^2$ by means of the objective $12^2$ over the swinging mirror 27 for instance an oscillograph mirror, into the slit diaphragm 28, which scale line $6^2$ is lit by the wire 29 of the light source 30, by means of the condenser 31. The wire 29 of the light source 30 projected through the condenser 31 onto the objective $12^2$ is transferred onto the photo cell 33 by means of the field lens 32 and lights up evenly the light sensitive face of the photo cell 33.

If the swinging mirror 27 oscillates about an axis which is perpendicular to the plane of the drawing sheet and extends through the optical axis, the picture $10^2$ of the scale line $6^2$ and its surroundings swings periodically over the slit diaphragm 28. As indicator again either a cathode ray tube or an indicating instrument connected to the output of the photo cell 33 is used in the arrangement according to FIG. 1c. The electrical devices which follow the photo cell 33 are again demonstrated in greater detail in FIGS. 10 and 12.

FIG. 1ca discloses a practical embodiment of a swinging mirror, as it is used in the arrangement of FIG. 1c.

The structure corresponds with that of a slip oscillograph. A permanent magnet 34 is secured to a frame 35 and the mirror 27 is disposed in the homogeneous part by means of a wire loop 36. The wire loop 36 is clamped between the adjustment screw 37 and the resilient mounting 38, so that the wire loop 36 is completely insulated relative to the frame 35. The wire loop 36 receives its current through the feeding wires 39 and 40, which are connected with the low frequency generator 41. If the frequency and the amplitude of the low frequency generator 41 is properly adjusted, the mirror 27 swings about the axis indicated in point dotted lines.

Referring now again to the drawings and in particular to FIG. 1d, it will be readily seen, that the equally lit wire 29' of the band lamp 30' is projected through the condenser 31' to the slit diaphragm 28'. The slit diaphragm 28', which is thus lit, is projected through the objective 12³ over the swinging mirror 27' onto the scale line 6³ of the measuring rod 3³ and its surroundings.

A picture is produced in the objective 12³ by means of the field lens 32' from the condenser 31', and the field lens 32² throws a picture onto the photo cell 33' from the objective 12³ and from the picture of the condenser 31' disposed in the objective 12³. In this manner the light sensitive face of the photo cell 33' is thus equally lit. If now the swinging mirror 27' swings about an axis which extends through the optical axis and an axis perpendicular to the plane of the sheet of the drawing, the picture of the lit slit diaphragm 28' swings periodically over the scale line 6³.

As to the indicating instrument and to the devices following the photo cell, the same applies what has been stated in connection with FIGS. 1a, 1b and 1c.

The operation or application of the principle of the present invention is now demonstrated by means of the examples given in FIGS. 2 to 7, using the arrangement disclosed in FIG. 1a.

In these figures the differently hatched fields have particular meaning, namely:

(1) The rectangular fields cross-hatched from the left top corner towards the right bottom corner constitute the scale lines 6 of the measuring rod 3.

(2) The non-hatched rectangular fields constitute the light field 7 and in particular the rectangular field shown in dotted lines indicates the left extreme position of the light field 7 and the full line rectangular field indicates the right extreme position of the light field 7.

(3) The unlimited field constitutes the surface of the measuring rod 3.

Thus, FIG. 2 shows a portion of the measuring rod 3 over the scale line 6 of which the rectangular picture of the light point 2, which is similar to the scale line and which lights up the measuring rod 3, swings as the light field 7 across the scale symmetrically to both sides from a zero position. In FIG. 2 both extreme positions of the light field 7 are shown. In accordance with the present invention, the amplitude of the swinging movement is measured in such a manner, that in the symmetry position in which the symmetry line of the swinging movement coincides with the symmetry line of the scale line which is perpendicular to the scale direction, the shading of the light field and the light tube in the right extreme position of the light field 7, as well as in the extreme left position of the light field 7 through the scale line 6 or the picture thereof amounts to a fraction of the maximum shading, which may be achieved by exclusive moving of the scale line relative to the light tube in direction of the scale. In this case in the extreme positions selective small adjustments of the scale line relative to the light field across the scale cause light stream changes. This is the case in FIG. 3, as long as in the left extreme position the left edge of the scale line 6 in the right extreme position the right edge of the scale line 6 comes to lie between the two longitudinal edges of the light field.

As long as the left edge of the scale line 6 in its left extreme position and the right edge of the scale line 6 in its right extreme position is disposed between the two longitudinal edges of the light field 7, the shading of the light field 7 and of the light tube, respectively, by the scale line 6 or its picture, amounts to, as required, only a finite fraction of the maximum shading, which may be brought about by exclusive displacement of the scale line relative to the light tube across the scale.

The energy drop on the working resistance of the photo cell has then a typical time curve, as shown in FIG. 8a.

As can be readily seen, the successive amplitudes of the light stream changes are in the symmetry position and, thereby, also the corresponding energy drops on the working resistance of exactly like size.

In FIG. 4 the described symmetry line of the scale line in the zero position does not coincide anymore with the symmetry line of the swinging movement of the light spot. Yet, in the left as well as in the right extreme position a shading takes place, which is only a fraction of the maximum possible shading of the light field by the scale line. In this case the amplitudes of the successive energy drops on the working resistance of the photo cell are no more of equal size, as shown in FIG. 8b. If the relative position becomes still more asymmetric, yet in such manner, that at the left as well as at the right in the extreme positions only a limited portion of the maximum possible shading of the light field picture by the scale line takes place, occurrencies of the energy drops on the working resistance of the photo cell occur successively, as shown in FIGS. 8c and 8d. If the scale line is moved still further relative to the zero position of the swinging light spot, finally the case shown in FIG. 5 is reached, in which in the maximum elongation of the light field on one side, the maximum possible shading of the light field picture takes place by the scale line. In FIG. 5, for instance, the maximum shading is achieved only in the left extreme position of the light field picture, but not in the right extreme position.

In this case the curve of the energy drop on the working resistance of the photo cell in accordance with FIG. 8e is obtained. Upon further displacement the energy drops shown in FIGS. 8f and 8g result, in case of still further displacement, as shown in FIG. 6, the energy drop appears to be as shown in FIG. 8h. If the displacement is still further increased, so that in both extreme positions the scale line and the light spot do not overlap each other any more, no light stream change takes place and thus also no change of the energy drop occurs.

If the successive displacements between the light field and the scale line occur out of the symmetry position towards the other side occur, successively curves of the energy drop on the working resistance of the photo cell are created, as shown in FIGS. 8i to 8p. The FIG. 8h over FIGS. 8a to 8p demonstrate the energy drops on the working resistance of the photo cell, if the scale line is displaced from one side over the symmetry position towards the other side of the light spot.

The figures are arranged in such manner, that the values of the energy drops on the working resistance of the photo cell correspond with the extreme positions of the light field, which are shown below each other. The line D indicates always the left extreme position of the swinging movement and the line G the right extreme position. It can be readily seen that between the curves of the energy drops on the working resistance of the photo cell of FIGS. 8b to 8h a kind of phase displacement towards the corresponding curves shown in FIGS. 8i to 8p takes place, as much as for instance in FIG. 8b on the line D the smaller change of the energy drop occurs, on the line G on the other hand in FIG. 8i.

This phase jump is used in the measurement as criterium, whether the scale line lies left or right from the symmetry position. The range to be deducted for the measurement is disposed about between the FIGURES 8d and 8l and constitutes the usable viewing field of the device.

As may be readily recognized, the largest usable viewing field and simultaneously the largest relative light stream change and, thereby, the largest relative change of the energy drop on the working resistance of the photo cell within the viewing field results, if according to FIG. 7 the width of the scale line is equal the width of the light spot and simultaneously the amplitude of the swinging movement has the half value of this width. The viewing field is then equal to the width of the scale line, that means in a scale line of 10 micron width it is ±5 micron.

The adjustment to the zero position and also the measuring of the displacement towards the zero position may be achieved for instance on the screen of an electron ray oscillograph, the time deviation of which is selected accordingly. For the adjustment the scale line is moved as long until the symmetry position corresponding with FIG. 8a is achieved. For the measuring of the deviation of the scale line from the symmetry position, the difference between the largest and the smallest amplitude, thus in the case of FIG. 8b the value $\Delta h$ is measured on the screen. A calibration curve is set up practically in the best way by empirical means about the relation between the values $\Delta h$ and the lateral displacement towards the zero position, for instance by interference measuring of the displacement of the scale line towards the symmetry position.

It must be emphasized that this dynamic symmetry adjustment has all advantages of the visual optical symmetry adjustment method. First of all, in each case the symmetry line of the scale line is determined, so that also deviations of the width of the scale line from line to line do not enter the measuring. Furthermore, in the first place, also the swinging amplitude of the light field, as much as it complies with the above-mentioned requirements, does not enter the measuring.

If, as it appears from the statement set forth above, the parameters, the width of the light field, the width of the scale line and the swinging amplitude are chosen differently as shown in FIGS. 2 to 7, sometimes a different curve of the light stream change results outside of the viewing field as shown in the individual curves of FIG. 8. This is, however, without significance for the measuring process, since inside of the above-mentioned usable viewing field the conditions remain unchanged.

Figure 9B:
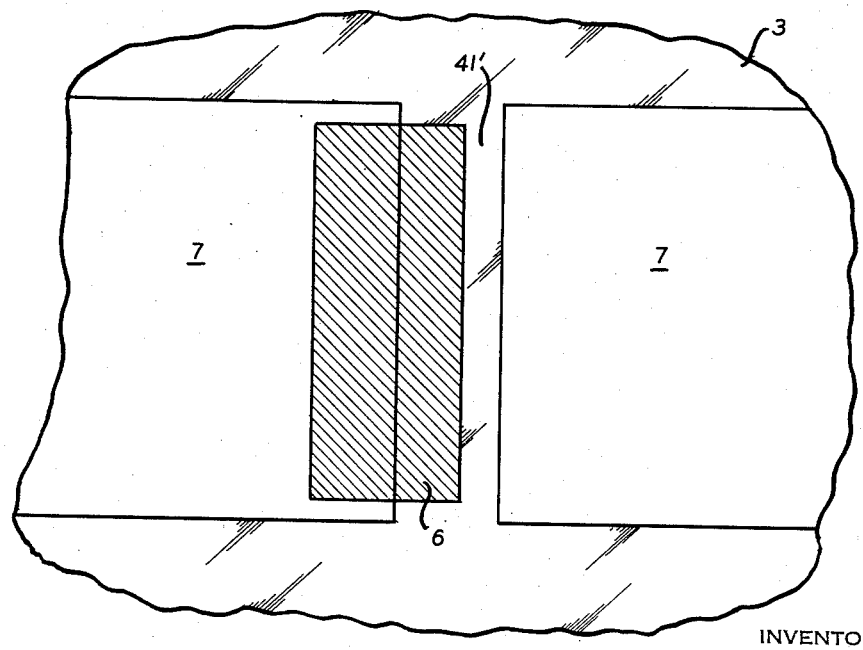

If a narrow, rectangular diaphragm, moving perpendicularly to the direction of the scale, swings over the light field, as is the case in connection with the swinging wire according to FIG. 1b, a void 41' is created in the light field which void swings in the direction of the scale and which is not penetrated by the light, as shown in FIG. 9a, according to which the light field is divided into two light fields of changing size, separated from each other. In this case the amplitude of the swinging movement of the void 41' relative to the scale line picture must be so great and the scale line picture must be so wide, that in the symmetry position, which is characterized by an arrangement according to which in the zero position the symmetry line of the scale line picture and the symmetry line of the void 41' coincides, in the case of the greatest deviation towards the left and towards the right, the void 41' covers partly the scale line, as shown in FIG. 9b for the right extreme position of the swinging movement. As may be readily seen in this case similar conditions are obtained as described in connection with the arrangement of FIG. 1a.

In the following described embodiments of applications of the photoelectric process in accordance with the present invention and in all other possible applications is, as stated before, either a cathode ray tube or an indicator instrument connected with the output of the photo cell, as shown in FIGS. 1a, 1b, 1c and 1d, is used as a reading device.

The measuring arrangement with the cathode ray tube is disclosed in FIG. 12.

As may be readily seen, a photo cell $9^4$ has a working resistance 42 and the photo cell $9^4$ receives its energy from the battery 43. The condenser 44 serves the purpose to couple the voltage changes appearing on the working resistance 42 with the band amplifier 45. The output of the band amplifier 45 is connected with the vertical deviation plates of the cathode ray tube 46. The tilting frequency of the oscillograph is adjusted in such manner that a standing picture appears. In this case the wave forms shown in FIG. 8 of the drawings appear directly on the screen of the tube. The wave figures do not correspond exactly to the expected theoretical curves, they are rather rounded out due to stray and diffraction effects of the optic.

The use of a pointer instrument as indicating device is shown in FIG. 10 of the drawing. This figure shows a tube measuring bridge which consists of two pentodes 47 and 48 between the cathode resistances 49 and 50 of which is disposed a pointer instrument 51. This pointer instrument 51 is a direct current instrument of the rotary coil type. The energy, which may be preamplified under certain circumstances and which is provided by the photo cell and the multiplier, respectively, is applied to the control grid 52 of both pentodes, so that for instance the energy curve shown in FIG. 8b appears. One of two rectangular voltages moved relative to each other at a phase of 180° is fed to the screen grids 53 of the pentodes. Since pentodes operate only with positive screen grid voltage, otherwise they are locked, in view of the opposite phases of both voltages, it is achieved that one pentode is always locked, while the other is in operative condition. In order to achieve a synchronization of this switching process with the position of the swinging producer, for instance of a swinging wire, the required rectangular voltage is derived at from the voltage of the sender which produces the swinging movement.

The circuit elements 54, 55, 56, 57, 58 and 59, with which the control grids of the pentodes and the screen grids of the pentodes are grounded, constitute resistances. Elements 56 and 57 are connected with the cathode.

FIG. 11a shows once more the energy curve of the photo cell voltage corresponding with FIG. 8b. Fig. 11b shows the sinus-shaped energy curve of the sender which holds the swinging element of the device, for instance a wire, in swinging movement, whereby, if necessary, it is provided by means of a phase mover, that the extreme values of the sender voltage curve coincide timely with the corresponding extreme positions of the wire.

The extreme values of this curve designated by D correspond to the left extreme position of the wire and the extreme values of the curve designated by G correspond with the right extreme position of the wire.

FIG. 11c shows the rectangular voltage curve which is arrived at upon electronic deformation of the sender voltage curve. This deformation may be brought about in known manner by amplification and following cut off of the sinus curve or also by means of electronic switching circuits. If this rectangular voltage according to FIG. 11c is fed to the screen grid of the pentodes 47, the photo cell curve shown in FIG. 11a to the screen grid amplifies the tube only in the cross-hatched shown parts of the photo cell curve. FIG. 11d shows a rectangular voltage curve which is moved relative to the rectangular voltage curve shown in FIG. 11c for a phase of 180°, which can be achieved by means of electronic means. If the phase-moved rectangular voltage according to FIG. 11d is fed to the screen grid of the pentode 48, while the screen grid is controlled in accordance with the photo cell curve, the pentode 48 amplifies only the non-hatched portions of the photo cell curve. The pointer measuring instrument adjusts itself corresponding with the difference between the hatched and non-hatched phase of the photo cell curve. By providing two load condensers on the screen grids it is, however, also possible that the measuring device adjusts itself in accordance with the difference between the maximum voltage values. The measuring device stands on zero in the symmetry position and swings towards the left or towards the right depending upon the direction in which the scale line has been displaced out from its symmetry position.

The described examples relates to process wherein the object, the position of which is to be adjusted or measured, is lit by throwing light therethrough. It is quite understood that the process of the present invention may be used also in such cases where the objects, for instance the scale lines of a metal measuring rod are lit by throwing light thereon.

Different applications of the photo-electric process of the present invention are now described below.

Figure 13A:
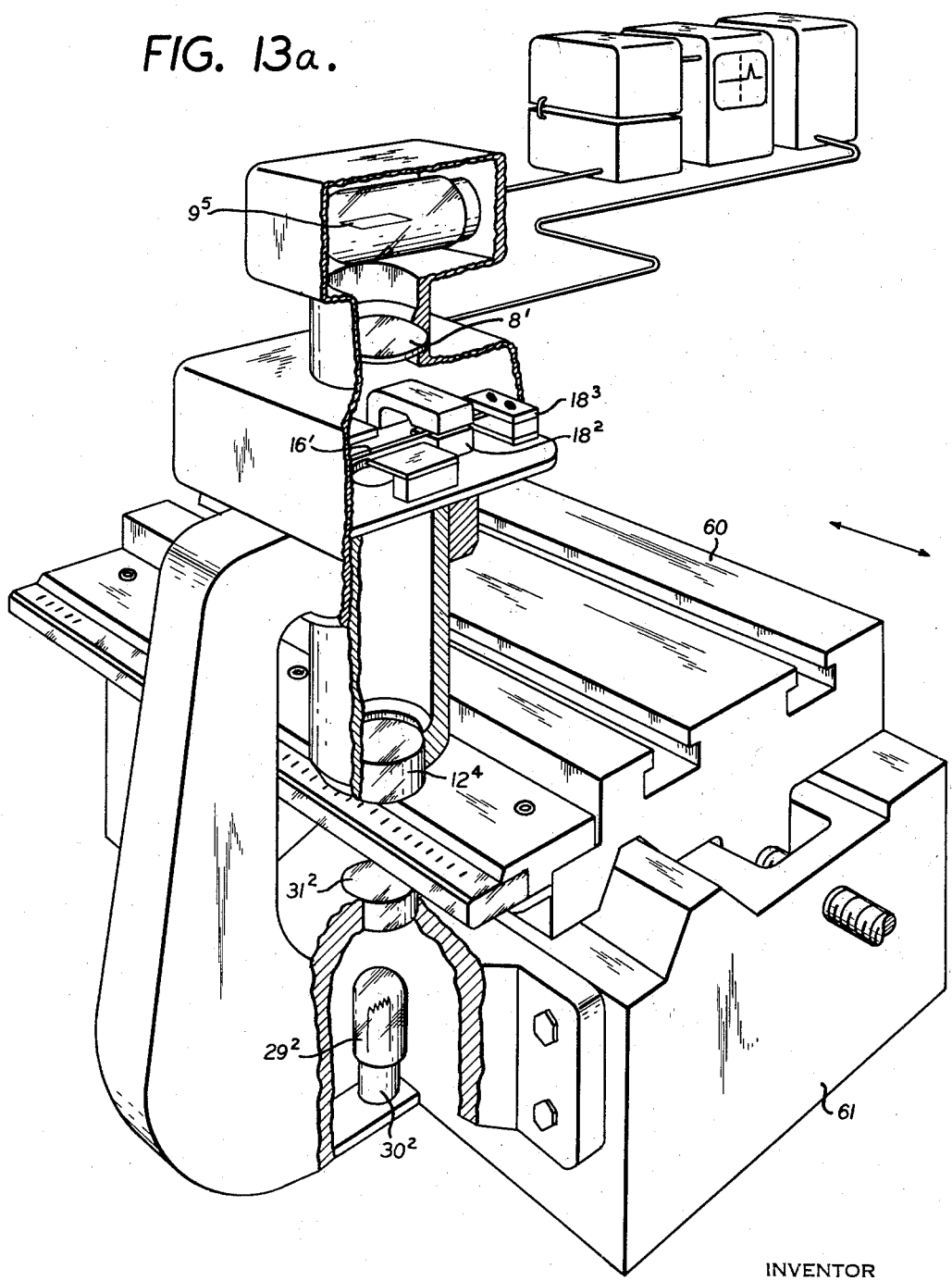
FIG. 13a is a perspective view of a device in which the arrangement disclosed in FIG. 1b is applied to a tool machine.

FIG. 13a discloses the process used in connection with the device shown in FIG. 1b and built into a tool machine. It is used here for the purpose either to move the slide 60 into a predetermined position to the machine bed 61, that means to adjust the slide 60 or it may be used for the purpose to secure the position of the slide 60 that is to measure its position. The optical part of this device comprises, in the same manner as shown in FIG. 1b, the lamp $30^2$ with the band $29^2$, the condenser $31^2$, the objective $12^4$ and the swinging system consisting of the parts $16'$, $12^4$, $18^2$ and $18^3$, the field lens $8'$ and the photo cell $9^5$. The shown swinging system of the device is more clearly demonstrated in FIG. 14 where all details are clearly described. It is to be understood, however, that instead of using system described above, each one of the swinging systems disclosed in FIGS. 15 to 19, which are described below, may be used.

FIG. 15 shows an electrostatic embodiment of a moving diaphragm which comprises again a wire $16'$, which is mounted under tension between the insulating holding blocks $18^3$. The two members $17'$ form a slit diaphragm which serves the purpose to limit the viewing field. An opening $19'$ is designed to permit the penetration of light. Furthermore this arrangement has two metallic edges $19^2$ at a close distance to the right and to the left from the wire $16'$ which edges $19^2$ determine the swinging plane of the wire $16'$ and which edges $19^2$ are insulated from their support by means of the two insulating pieces $19^3$. Symmetrical direct current voltages are applied to the edges $19^2$ to the ground potential $19^4$. Furthermore to one side of the wire $16'$, a proper alternating E.M.F. is fed, which originates with the low frequency generator $19^5$. The grounding terminal of this generator is also connected with the ground potential $19^4$ by the two batteries. Furthermore, on one side of the wire $16'$ a suitable alternating current voltage is applied, which is supplied by the low frequency generator $19^5$. The grounding of this generator is likewise connected with the ground potential $19^4$. By suitable adjustment of the frequency and amplitude of the low frequency generator $19^5$, the wire $16'$ performs a swinging movement in the planes determined by the position of the edges $19^2$. In this manner, in the first place, a swinging movement with sufficient amplitude is achieved, if the wire is thin enough and is excited in its ground frequency.

FIG. 16 discloses another embodiment in which a ferromagnetic wire $16^2$, clamped between the insulating blocks $18^3$, serves as a moving diaphragm. An alternating current magnet $19^6$ is disposed closely adjacent the wire $16^2$, which magnet $19^6$ comprises a coil with an iron core and which causes the swinging movement of the wire $16^2$, as soon as the coil of the magnet $19^6$ receives alternating current. Furthermore, in immediate vicinity of the wire $16^2$ is also a second coil $19^7$ having an iron core which serves as a pick-up. An alternating current voltage is produced in this second coil, which voltage corresponds with the wire frequency and which is applied to the grid of the triode 62 such, that a return coupling is brought about. The alternating current magnet $19^7$ is disposed in the anode circuit of the triode 62. By this circuit it is achieved, that the wire $16^2$ performs continuously swinging movements in the ground wave of its own frequency. An opening $19a$ is again provided for the light penetration and the two jaws $17^2$ form a slit for the limitation of the viewing field. The preliminary grid voltage of the tube is produced by the cathode resistance 63 which is bridged over by the condenser 64.

FIG. 17 shows a rod-like moving diaphragm $16^3$ which is secured to a quartz bending swinger 65. The frame 66 for the quartz is maintained in position by four wires 67. The viewing field is limited by means of the two members $17^3$ which form a slit diaphragm. The opening 19b serves the purpose of permitting of penetration of light. As electrical circuit an aperiodic-Eco circuit is chosen. The swinging amplitude of the quartz can be adjusted on the screen grid potentiometer. It is to be understood that any other of the many quartz sender circuits may be chosen.

The quartz swings continuously with its own frequency in the direction of the arrows shown in FIG. 17 in such manner that on those points at which the wire mountings are provided, swinging nodes are caused on both ends and antinodes or loops are caused in the center. If the moving diaphragm $16^3$ is sufficiently small and light as to its structure, it does not interfere with the swinging movement of the quartz. With a 2-kilo-Hertz quartz in which the quartz rod is of a length of about 100 mm., amplitudes of 0.2 to 0.3 mm. may be achieved in this manner. An edge of the quartz may also serve as a moving diaphragm. The swinger may be made also of course of any other piezo-electric crystal instead of quartz.

Figure 18:
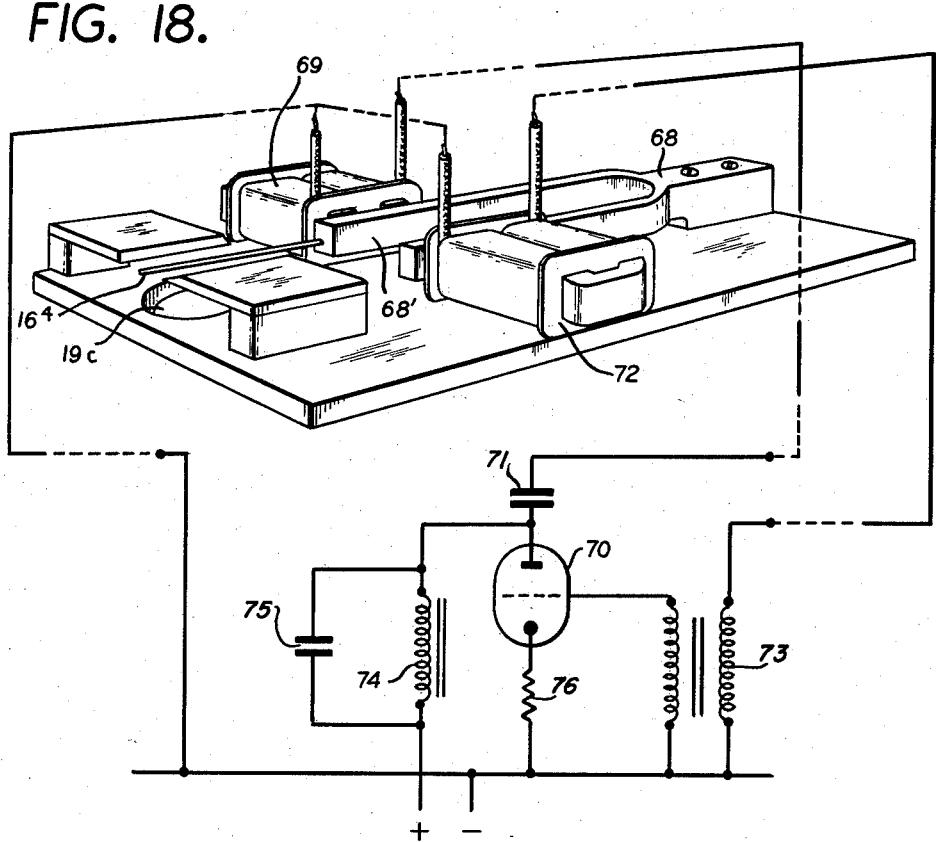

FIG. 18 constitutes an embodiment of a moving diaphragm with the help of a tuning fork 68. The moving diaphragm is formed by a wire $16^4$ which is secured to one of the two arms $68'$ of the tuning fork 68. The iron spool 69 having a coil operates as an alternating current magnet, which alternating current magnet is supplied with alternating current voltage by means of the triode 70 over the condenser 71. The second coil 72 serves as a pick-up. The voltage supplied by this coil during the swinging of the tuning fork is increased by the transformer 73 and is so switched to the grid of the triode 70, that it operates as a return coupling. The coil 74 and the condenser 75 form a swinging circuit, which serves as load resistance for the tube or triode 70 and is adjusted to the frequency of the tuning fork 68. The cathode resistance 76 serves for the production of the preliminary grid voltage. In this circuit, the tuning fork 68 performs continuously swinging movements in its own frequency. An opening 19c is provided for the penetration of light and the members $17^4$ serve the purpose to provide a slit diaphragm which limits the viewing field.

Figure 19:
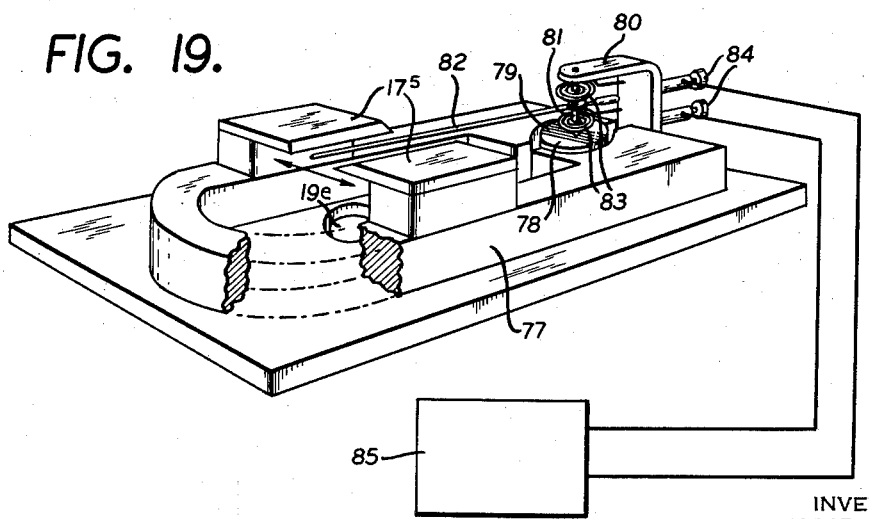

FIG. 19 shows the use of a pointer of a rotary coil galvanometer as a moving diaphragm. The two jaws $17^5$ form a slit diaphragm for limiting the viewing field and an opening 19e permits penetration of light. A permanent magnet 77 and a soft iron coil 78, which is disposed in the air slit of the permanent magnet 77, are provided. The rotary coil 79 is mounted in the bearing 80 by means of the axle 81.

The zero position of the pointer 82 is secured by means of the two oppositely operating torsion springs 83. Two insulated terminals 84 of the rotary coil 79 are provided, to which the low-frequency generator 85 is connected. If the amplitude and the frequency of the generator 85 is properly adjusted, the indicator 82 performs a swinging movement in the direction indicated by the arrows.

FIG. 13b shows an application of the device in accordance with the present invention, wherein the measuring rod $3^4$ is used as a normal measuring scale in order to measure another measuring rod $3^5$ as to scale errors. The device shown in FIG. 13b constitutes a longitudinal measuring comparator in which the optical microscopes are replaced by the devices 86 and 87 in accordance with the present invention.

The two devices 86 and 87 are immovable. The normal measuring rod $3^4$ and the measuring rod $3^5$, to be tested, are mounted on a movable slide 88. During the measuring process, the same steps or similar steps are taken as in the use of light microscopes. For the adjustment and for the measuring, respectively, instead of ocular screw micrometers of light microscopes, the two cathode ray tube screens 89 and 90 are used. For the determination of a predetermined position of the slide, the latter is displaced, until the corresponding scale line 6⁵ of the measuring rod 3⁴ which is rigidly secured to the slide is in such position that its picture coincides with the symmetry line of the swinging movement of the swinging wire.

FIG. 13c shows the use of the device in accordance with the present invention on a scale machine. The photoelectric device 91 is rigidly secured to the bed 92 of the scale machine. It serves for the adjustment of the scale lines 6⁷ of a normal measuring rod 3⁷ which is secured to a slide. In an extension of the normal measuring rod 3⁷ the scale carrier 3⁸ to be divided rests on this slide. The marker device 93 is disposed above the scale carrier 3⁸, which marker device 93, in the same manner as the photo-electric device 91, is rigidly connected with the bed of the scale machine. By means of the photo-electric device 91 it is possible to position the individual scale lines of the normal scale 3⁷ by displacement of the slide and in each of the adjusted positions the marker device 93 is operated.

Referring now to FIG. 13d an arrangement is shown in which the device in accordance with the present invention is applied for the determination of the expansion coefficient of materials. The rod 94 to be tested, which consists of the material to be tested, is clamped at one end in a block 95. It carries at its other free end a short piece of a longitudinal scale consisting of scale lines 6⁸. If necessary, a single scale line 6⁸ only may be provided also on the other end of the rod.

By means of this device the thermal expansion of the testing rod may be secured by measuring the position of the scale line according to numbers.

As may be easily ascertained, the electrical values of the light sensitive elements which correspond with the symmetry adjustment particularly the values of the photo cells may be used in known manner for the control and particularly of such control of scale machines.

It is to be understood that the process is not only to be used for the measuring and adjustment of the position of scale lines or measuring marks, but may be used or applied also for the measuring and adjustment of other objects as for instance stars, shooting marks for instance in the field of geodesy, etc.

While I have disclosed several embodiments of the present invention it is to be understood that these embodiments are given by example only and not in a limiting sense, the scope of the present invention being determined by the objects and the claims.

I claim:
1. A photoelectric process for measuring and adjusting the position of objects, particularly of scale lines by means of symmetry adjustments, wherein a scale line or an image thereof oscillates about a zero position relative to a diaphragm, to an image of the latter or to a light source, the latter emanating a light beam through the diaphragm onto a photoelectric cell, comprising the steps of
    oscillating said scale line and an image of the latter, respectively, about a symmetry line by means of a light beam to form shading areas for an amplitude such that at the greatest oscillation said shading areas amounts to a fraction of the maximum possible shading by said oscillation, during an oscillation disposed symmetrically to said scale line and an image of the latter, respectively, and
    measuring the amplitude deviations of said light beam impinging on said photoelectric cell.
2. The process, as set forth in claim 1, wherein
    the amplitude in said oscillating step is of a value that an edge of said scale line and of an image thereof, respectively, coincides with said symmetry line, upon oscillation of said diaphragm symmetrically relative to said scale line and an image of the latter, respectively.
3. The process, as set forth in claim 1, wherein
    said scale line and an image thereof, respectively, are of a width equal to the area disposed between the edges of said shading areas.
4. The process, as set forth in claim 1, wherein
    said measuring step of the amplitude deviation is performed by electronic means.
5. The process, as set forth in claim 4, which includes the step of
    forming a current curve corresponding with the oscillation of said scale line and an image thereof, respectively, in order to determine the position of said scale lines and said image thereof, respectively, from said curve.
6. The process, as set forth in claim 1, which includes the step of
    transforming said symmetry adjustment into electrical values adapted for the control of dividing machines.

References Cited in the file of this patent
UNITED STATES PATENTS

| | | |
|---|---|---|
| 958,181 | Schloemilch | May 17, 1910 |
| 2,375,665 | Koulicovitch | May 8, 1945 |
| 2,401,712 | Turrettini | June 4, 1946 |
| 2,406,299 | Koulicovitch | Aug. 20, 1946 |
| 2,720,810 | Senn | Oct. 18, 1955 |
| 2,882,420 | Koulicovitch | Apr. 14, 1959 |

FOREIGN PATENTS

| | | |
|---|---|---|
| 684,435 | Great Britain | Dec. 17, 1952 |
| 787,338 | Great Britain | Dec. 4, 1957 |